Aug. 18, 1959    H. N. KEENER    2,900,489
CONTACT JAW ASSEMBLY FOR ELECTRIC WELDING
Filed Sept. 14, 1956

HOWARD N. KEENER
INVENTOR

BY Herbert J. Brown

ATTORNEY

United States Patent Office 2,900,489
Patented Aug. 18, 1959

2,900,489

CONTACT JAW ASSEMBLY FOR ELECTRIC WELDING

Howard N. Keener, Fort Worth, Tex.

Application September 14, 1956, Serial No. 609,921

3 Claims. (Cl. 219—136)

This invention relates to contact jaws for welding electrodes and has particular reference to a contact jaw assembly for arc welding machines employing automatically fed electrodes.

In automatic arc welding devices of the type wherein a consumable electrode is continuously fed through a contact jaw as a metal part to be welded is passed beneath the jaw, certain detrimental effects have resulted heretofore from the wearing away of contact surfaces of the jaws. Generally, contact jaws serve the dual function of positioning the electrode and at the same time maintaining an electrical contact between a source of electrical current and he electrode. Experience has shown that those metals, notably copper, which serve most effectively for maintaining electrical contact with an electrode are most subject to frictional wear, and that hard surfaces which offer the greatest resistance to wear are relatively poor electrical conductors and may from time to time lose electrical contact with an electrode.

An object of the present invention is to provide a contact jaw for automatic arc welding devices which resists frictional wear and which efficiently maintains contact with an electrode.

Another object of the invention is to provide a contact jaw for automatic arc welding devices which may be used efficiently for relatively long periods of time without replacement or adjustment.

A further object of the invention is to provide a contact jaw assembly for automatic arc welding devices wherein a relatively high degree of accuracy in positioning an electrode may be maintained.

A particular object of the invention is to provide a contact jaw for electric arc welding devices which is capable of rigidly positioning one end of a consumable electrode with respect to relative longitudinal motion of an object being welded.

A further object of the invention is to provide means in a contact jaw for automatic arc welding devices whereby electrical contacting members are urged against an electrode and retain contact therewith as the surfaces of the contact members are worn away by frictional contact with the electrode.

Another object of the invention is to provide construction for a contact jaw for automatic arc welding devices wherein lateral positioning of a consumable electrode may be made by simple adjustment of a single jaw member.

These and other objects of the invention will become apparent from the following description and the accompanying drawings wherein.

Figure 1:
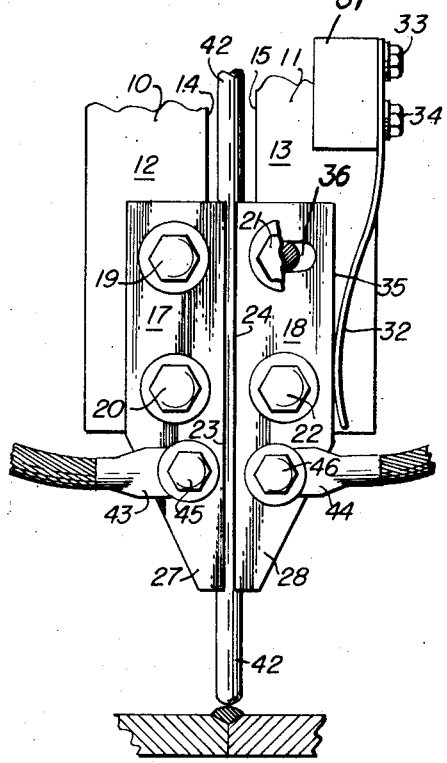
Figure 1 is a front elevational view of a contact jaw assembly embodying features of the present invention.
Figure 2:
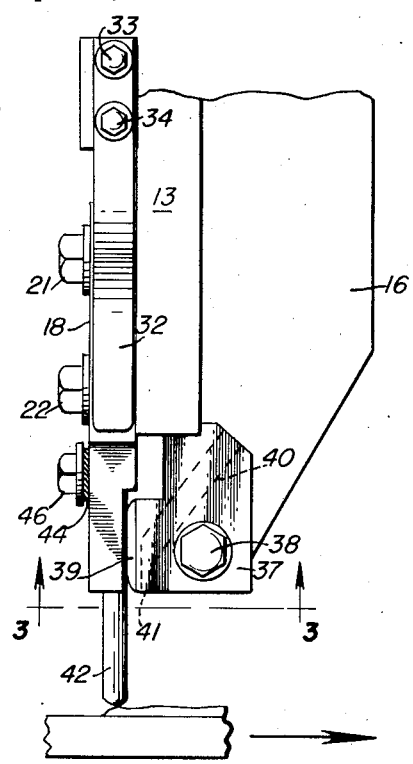
Figure 2 is a side elevational view of the contact jaw assembly shown in Figure 1.
Figure 3:
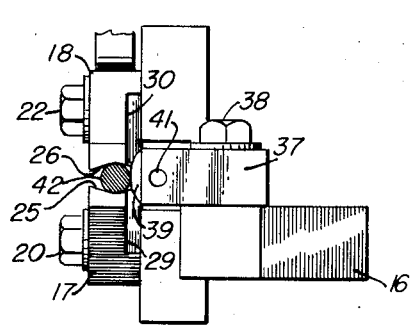
Figure 3 is a bottom view of a contact jaw assembly taken along line 3—3 of Figure 2.
Figure 4:
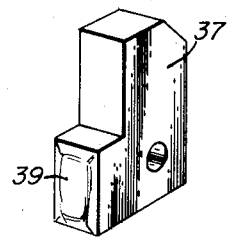
Figure 4 is a perspective view of a longitudinal guide member for a contact jaw member as described herein.

Primarily, the invention comprises a combination of coacting jaw members adapted for attachment to conventional automatic arc welding machines of the type which utilize consumable electrodes in the formation of weld deposits. Typically, these machines drive an electrode through a contact jaw by a servo-mechanism sensitive to variations in arc voltage brought about by fluctuations in the length of the electric arc. A second drive mechanism moves the piece being welded relative to the electrode so that a linear weld deposit is formed automatically when electrical current flows between the electrode and the piece being welded.

In the drawings, a jaw supporting frame comprising vertical supporting members 10 and 11 is rigidly attached to an automatic arc welding machine (not shown) and is positioned above the piece to be welded. Each vertical supporting member 10 and 11 is constructed of metal flat stock in substantially rectangular shape with respective forward surfaces 12 and 13 of the supporting members 10 and 11 in parallel alignment with one another; opposed edges 14 and 15 of the vertical supporting members 10 and 11 are regularly spaced from one another by a distance sufficient to admit a welding electrode therebetween. A rear frame member 16 is likewise attached to the automatic arc welding machine (not shown) and extends rearwardly of the inner edge 14 of one vertical supporting member 10 in a position substantially perpendicular to the forward surfaces 12 and 13 of the vertical supporting members 10 and 11. Lateral jaws 17 and 18 are positioned forwardly of and adjacent the forward surfaces 12 and 13 of the vertical supporting members 10 and 11. Each lateral jaw 17 and 18 is made of flat stock of copper or other highly conductive metal in substantially rectangular shape and each lateral jaw is attached to a vertical supporting member 10 or 11 in a position parallel therewith by bolts 19, 20, 21 and 22 extending through openings in the respective lateral jaws and engaging corresponding threaded openings within the respective vertical supporting members. Opposed inner edges 23 and 24 of the lateral jaws 17 and 18 are regularly spaced from one another in approximately parallel alignment with the inner edges 14 and 15 of the vertical supporting members 10 and 11. Arcuate grooves 25 and 26 for receiving welding electrodes are formed coextensively within the inner edges 23 and 24 of the lateral jaws 17 and 18. Lower portions 27 and 28 of the lateral jaws 17 and 18 project downwardly of the lower termination of the vertical supports 10 and 11 and are tapered downwardly and inwardly toward the inner edges 23 and 24 thereof. The rearward surfaces 29 and 30 of the lower portions 27 and 28 of the lateral jaws 17 and 18 are shouldered to form a flat recess within the rearward lower portions of the lateral jaws.

A spring supporting block 31 is attached as by welding to the forward surface 13 of one of the vertical supporting members 11 at a position thereon above the lateral jaws 17 and 18. A leaf spring 32 is secured to the spring supporting block 31 by bolts 33 and 34 and extends downwardly thereof bearing against the outer edge 35 of that lateral jaw 18 supported by the vertical supporting member 13 which also supports the spring supporting block 31. It will be noted that openings 36 (see Figure 1) for bolts 21 and 22 holding the lateral jaw 18 to the vertical supporting member 13 are laterally elongated to permit lateral movement of the jaw 18 relative to the vertical supporting member.

An L-shaped rear jaw 37 is attached to the lower portion of the rear frame member 16 by a bolt 38. The forwardly extending lower termination 39 of the L-shaped rear jaw 37 is clad with hard facing material such as tungsten carbide particles in steel matrix and is positioned within the recess at the lower portions 27 and 28 of the lateral jaws 17 and 18. A tubular passage 40 approximately ⅜ inch in diameter extends diagonally downward through the L-shaped rear jaw 37 for the conduction of auxiliary welding components such as hard facing particles therethrough, and an outlet port 41 of approximately 3/16 inch in diameter is positioned rearwardly of the hard facing 39 and communicates with the diagonal passage 40, extending downwardly thereof.

A welding electrode 42 of standard diameter is positioned between the lateral jaws 17 and 18 within the grooves 25 and 26 and forwardly adjacent the hard surfacing 39 of the L-shaped rear jaw. Electrical conductor cables are attached to the lower portions 27 and 28 of the lateral jaws 17 and 18 by bolts 45 and 46.

In operation, a welding electrode 42 is positioned between the lateral jaws 17 and 18 and is driven downwardly therebetween by a conventional voltage controlled electrode driving mechanism (not shown). Lateral tension exerted by the leaf spring 32 against one lateral jaw member 18 urges that member against the electrode 42 and maintains electrical contact between the lateral jaws 17 and 18 and the electrode. The hard facing material clad to the forwardly extending lower termination 39 of the L-shaped rear jaw 37 bears against the rearward side of the electrode 42 and resists rearward movement of the electrode when that electrode comes into physical contact with the piece being welded. The diagonal passage 40 and outlet port 41 through the L-shaped rear jaw permits hard facing particles such as tungsten carbide to be dropped directly behind a welding arc into still molten metal.

The invention is not limited to the exemplary construction herein shown and described, but may be made in various ways within the scope of the appended claims.

What is claimed is:

1. In an electric welding device having a jaw supporting frame including forward vertical supporting members and a rear frame member having an adjacent rear frame member, vertical jaw members secured to said vertical supporting members in side by side relation, said jaw members having opposing vertical grooves in coextensive rear edges thereof for receiving an electrode therein, said jaws being positioned above a workpiece therebeneath and movable relative to the arc end of said electrode and toward said rear frame member, and an L-shaped guide member carried by said rear frame member, the lower projecting end of said L-shaped guide member being in contact with the exposed surface of said electrode between and carried in the arcuate grooves in said rear edges of said jaw members.

2. The construction defined in claim 1 and wherein the surface of said guide member in contact with said electrode is clad with a hard facing material.

3. The construction defined in claim 1 and wherein the material of said guide member is harder than the material of said jaw members.

References Cited in the file of this patent

UNITED STATES PATENTS

| | | |
|---|---|---|
| 2,184,335 | Chapman | Dec. 26, 1939 |
| 2,289,938 | Smith | July 14, 1942 |
| 2,364,826 | Smith | Dec. 12, 1944 |
| 2,379,470 | Baird | July 3, 1945 |
| 2,398,355 | Bristol | Apr. 16, 1946 |
| 2,756,310 | Galbraith | July 24, 1956 |

FOREIGN PATENTS

| | | |
|---|---|---|
| 641,564 | Great Britain | Aug. 16, 1950 |